(12) United States Patent
Toda et al.

(10) Patent No.: US 11,333,501 B2
(45) Date of Patent: May 17, 2022

(54) NAVIGATION DEVICE, METHOD OF GENERATING NAVIGATION SUPPORT INFORMATION, AND NAVIGATION SUPPORT INFORMATION GENERATING PROGRAM

(71) Applicant: Furuno Electric Co., Ltd., Nishinomiya (JP)

(72) Inventors: Hiroyuki Toda, Nishinomiya (JP); Masashi Sugimoto, Itami (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 292 days.

(21) Appl. No.: 16/585,609

(22) Filed: Sep. 27, 2019

(65) Prior Publication Data
US 2020/0109948 A1  Apr. 9, 2020

(30) Foreign Application Priority Data
Oct. 3, 2018 (JP) .............................. JP2018-187850

(51) Int. Cl.
| G01C 21/16 | (2006.01) |
| G01S 19/40 | (2010.01) |
| G01S 19/52 | (2010.01) |
| G01S 19/53 | (2010.01) |
| G01S 19/37 | (2010.01) |
| G01S 19/39 | (2010.01) |

(52) U.S. Cl.
CPC .......... *G01C 21/165* (2013.01); *G01S 19/37* (2013.01); *G01S 19/40* (2013.01); *G01S 19/52* (2013.01); *G01S 19/53* (2013.01); *G01S 19/393* (2019.08)

(58) Field of Classification Search
CPC combination set(s) only.
See application file for complete search history.

(56) References Cited

U.S. PATENT DOCUMENTS
| 2011/0068975 A1* | 3/2011 | Zietz ....................... 342/357.36 |
| 2018/0017390 A1* | 1/2018 | Shen |
| 2018/0095476 A1* | 5/2018 | Madsen |

FOREIGN PATENT DOCUMENTS
JP  2012-215485 A  11/2012

* cited by examiner

*Primary Examiner* — Russell Frejd
*Assistant Examiner* — Anthony M Gartrelle
(74) *Attorney, Agent, or Firm* — Xsensus LLP

(57) ABSTRACT

A navigation device may include a GNSS data editing part, an attitude angle calculating part, and a speed calculating part. The GNSS data editing part may generate GNSS attitude angle estimation data and GNSS speed estimation data by using first GNSS data based on a GNSS signal received by a first antenna, and second GNSS data obtained at a shorter cycle than the first GNSS data based on a GNSS signal received by a second antenna. The attitude angle calculating part may estimate an integrated attitude angle based on the IMU angular velocity outputted from an Inertial Measurement Unit (IMU) and the GNSS attitude angle estimation data. The speed calculating part may estimate an integrated speed based on an IMU acceleration outputted from the IMU, the GNSS speed estimation data, and the integrated attitude angle.

20 Claims, 9 Drawing Sheets

NAVIGATION DEVICE, METHOD OF GENERATING NAVIGATION SUPPORT INFORMATION, AND NAVIGATION SUPPORT INFORMATION GENERATING PROGRAM

CROSS-REFERENCE TO RELATED APPLICATION(S)

This application claims priority under 35 U.S.C. § 119 to Japanese Patent Application No. 2018-187850, which was filed on Oct. 3, 2018, the entire disclosure of which is hereby incorporated by reference.

TECHNICAL FIELD

The present disclosure relates to a technology to calculate a speed or a displacement of an object by using GNSS data based on a GNSS signal, and IMU data measured by an inertia sensor.

BACKGROUND

JP2012-215485A discloses a calculation of a position of a movable body by using a GPS measurement result and an INS measurement result.

However, when the GPS measurement result and the INS measurement result are used, an amount of processing data becomes more than a case where either one of them is used. Further, if the calculation accuracy of the position is improved, the amount of processing data further increases.

On the other hand, if the amount of processing data is simply reduced, it becomes impossible to realize the desired calculation accuracy.

SUMMARY

Therefore, one purpose of the present disclosure is to provide a technology capable of calculating a speed and a displacement with high precision, while preventing an increase in an amount of processing data.

According to one aspect of the present disclosure, a navigation device may include a GNSS data editing part, an attitude angle calculating part and a speed calculating part. The GNSS data editing part may generate GNSS attitude angle estimation data and GNSS speed estimation data by using first GNSS data based on a GNSS signal received by a first antenna, and second GNSS data obtained at a shorter cycle than the first GNSS data based on a GNSS signal received by a second antenna. The attitude angle calculating part may estimate an integrated attitude angle based on the IMU angular velocity outputted from an Inertial Measurement Unit (IMU) and the GNSS attitude angle estimation data. The speed calculating part may estimate an integrated speed based on an IMU acceleration outputted from the IMU, the GNSS speed estimation data, and the integrated attitude angle.

The GNSS data editing part may include a data extracting part and an attitude angle data generating part. The data extracting part may generate the GNSS speed estimation data based on the second GNSS data, and extract the second GNSS data at the cycle of the first GNSS data. The attitude angle data generating part may generate the GNSS attitude angle estimation data based on the second GNSS data extracted by the data extracting part, and the first GNSS data.

According to this configuration, the cycle of the GNSS data used to calculate the integrated attitude angle may become longer. Here, the accuracy of the attitude angle may not be easily fallen compared to that of the speed, even if the cycle of GNSS data becomes long. By lengthening the cycle of the GNSS data used to calculate the integrated attitude angle, the amount of processing data is reduced compared to when the cycle of the GNSS data for the integrated attitude angle is set as the same as the cycle of the GNSS data for the integrated speed.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

A navigation device, a method of generating navigation support information, and a navigation support information generating program according to a first embodiment of the present disclosure will be described with reference to the drawings. Note that, below, although a ship is used as a movable body, a configuration of the present disclosure is also applicable to other water-surface movable bodies, underwater movable bodies, land movable bodies, or air movable bodies.

Figure 1:
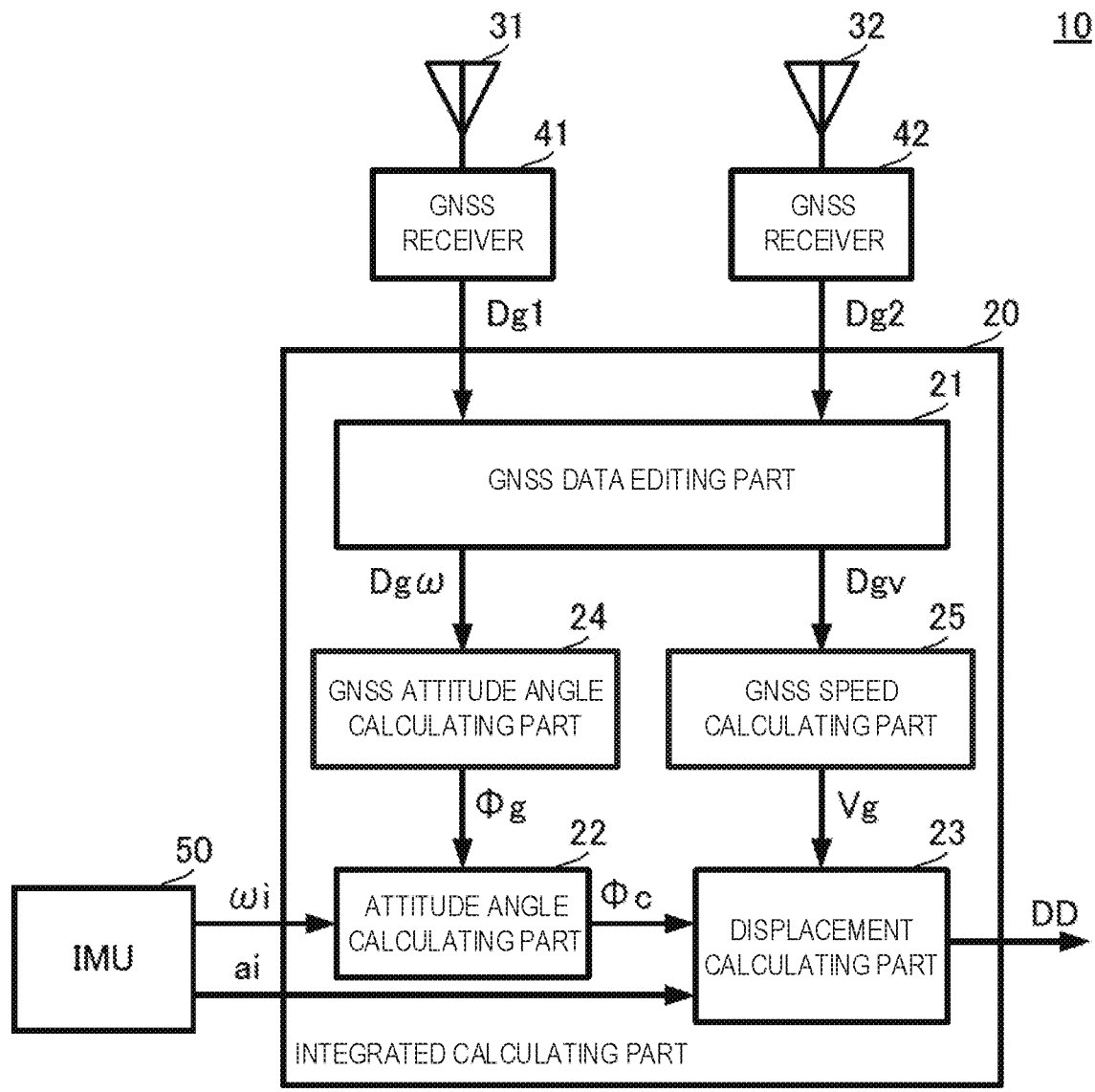
FIG. 1 is a functional block diagram of a navigation device according to a first embodiment of the present disclosure.

FIG. 1 is a functional block diagram of the navigation device according to the first embodiment of the present disclosure. As illustrated in FIG. 1, the navigation device 10 may include an integrated calculating part 20, a GNSS antenna 31, a GNSS antenna 32, a GNSS receiver 41, a GNSS receiver 42, and an IMU 50. The GNSS antenna 31 may correspond to a "first antenna" of the present disclosure, and the GNSS antenna 32 may correspond to a "second antenna" of the present disclosure. Note that the navigation device 10 may be provided at least with the integrated calculating part 20.

The GNSS antenna 31 and the GNSS antenna 32 may be installed in a ship (not illustrated) to which the navigation device 10 is mounted. The GNSS antenna 31 and the GNSS antenna 32 may be installed in a so-called "Open Sky environment."

The GNSS antenna 31 may receive a GNSS signal from a GNSS satellite (not illustrated), and output it to the GNSS receiver 41. The GNSS antenna 32 may receive a GNSS signal from another GNSS satellite (not illustrated), and output it to the GNSS receiver 42.

The GNSS signal may be a signal which is a carrier signal at given frequency being superimposed with a PRN (pseudo random noise) code and navigation message data. The PRN code may be a code for identifying a positioning satellite as a transmission source. The navigation message data may be data including orbital information and correction information of the positioning satellite.

The GNSS receiver 41 and the GNSS receiver 42 may be respectively implemented by a memory which stores a program for acquisition and tracking of the GNSS signal, and an operation element, such as an IC, which executes the program.

The GNSS receiver 41 and the GNSS receiver 42 may acquire and track the acquired GNSS signal by a known method. Here, the GNSS receiver 41 and the GNSS receiver 42 may acquire and track the code and the carrier signal.

The GNSS receiver 41 may acquire GNSS data Dg1 by the acquisition and tracking, and output it to the integrated calculating part 20. Here, the GNSS receiver 41 may perform the acquisition and the output of the GNSS data Dg1 at an interval of a first frequency f(Dg1).

The GNSS receiver 42 may acquire GNSS data Dg2 by the acquisition and tracking, and output it to the integrated calculating part 20. Here, the GNSS receiver 42 may perform the acquisition and the output of the GNSS data Dg2 at an interval of a second frequency f(Dg2).

The second frequency f(Dg2) may be higher than the first frequency f(Dg1). That is, the first cycle may be shorter than the second cycle. For example, the first frequency f(Dg1) may be 1 [Hz], and the second frequency f(Dg2) may be 5 [Hz]. Note that such frequencies are one example, and the second frequency f(Dg2) may be set to any value as long as it is higher than the first frequency f(Dg1).

The acquisition of the GNSS data Dg1 by the GNSS receiver 41 and the acquisition of the GNSS data Dg2 by the GNSS receiver 42 may be performed synchronizing with the time of the GNSS.

The GNSS data Dg1 and the GNSS data Dg2 may include at least an integrated value (ADR) of the carrier phase. Note that the GNSS receiver 41 and the GNSS receiver 42 may also output to the integrated calculating part 20 as the GNSS data Dg1 and the GNSS data Dg2 including a Doppler frequency of the carrier signal, a code phase, a pseudo range calculated by the code phase, and a measured position.

The IMU 50 may include an acceleration sensor and an angular velocity sensor. The IMU is an abbreviation of Inertial Measurement Unit. The IMU 50 may be installed in the ship (not illustrated) to which the navigation device 10 is mounted. The IMU 50 may measure an acceleration and an angular velocity by detecting a physical motion of the navigation device 10.

Note that the IMU 50 may be desirably disposed substantially at the same position as the GNSS antenna 31 and the GNSS antenna 32. However, the IMU 50 may be separated from the GNSS antenna 31 and the GNSS antenna 32. In this case, if a known lever-arm correction is applied, the fall of measurement accuracy of the speed and the displacement can be prevented.

The IMU 50 may measure an IMU acceleration "ai" and an IMU angular velocity "ωi," and output them to the integrated calculating part 20 as IMU measurement data. Note that the frequency of the output of the IMU measurement data (IMU output frequency) from the IMU 50 may be higher than the frequency of the acquisition and the output of the GNSS data Dg1 and the GNSS data Dg2. That is, the IMU output frequency may be higher than the first frequency and the second frequency. For example, the IMU output frequency may be about 10 [Hz] to about 100 [Hz]. Note that, if the IMU output frequency is higher than each output value of the GNSS system, it can be changed to a desired value.

The integrated calculating part 20 may include a GNSS data editing part 21, an attitude angle calculating part 22, a displacement calculating part 23, a GNSS attitude angle calculating part 24, and a GNSS speed calculating part 25. The integrated calculating part 20 may be implemented by a program which realizes processings of the functional parts, a memory which stores the program, and a processor, such as a CPU, which executes the program.

The GNSS data Dg1 and the GNSS data Dg2 may be inputted into the GNSS data editing part 21. The GNSS data editing part 21 may generate GNSS attitude angle estimation data Dgω, and GNSS speed estimation data Dgv based on the GNSS data Dg1 and the GNSS data Dg2.

Figure 2:
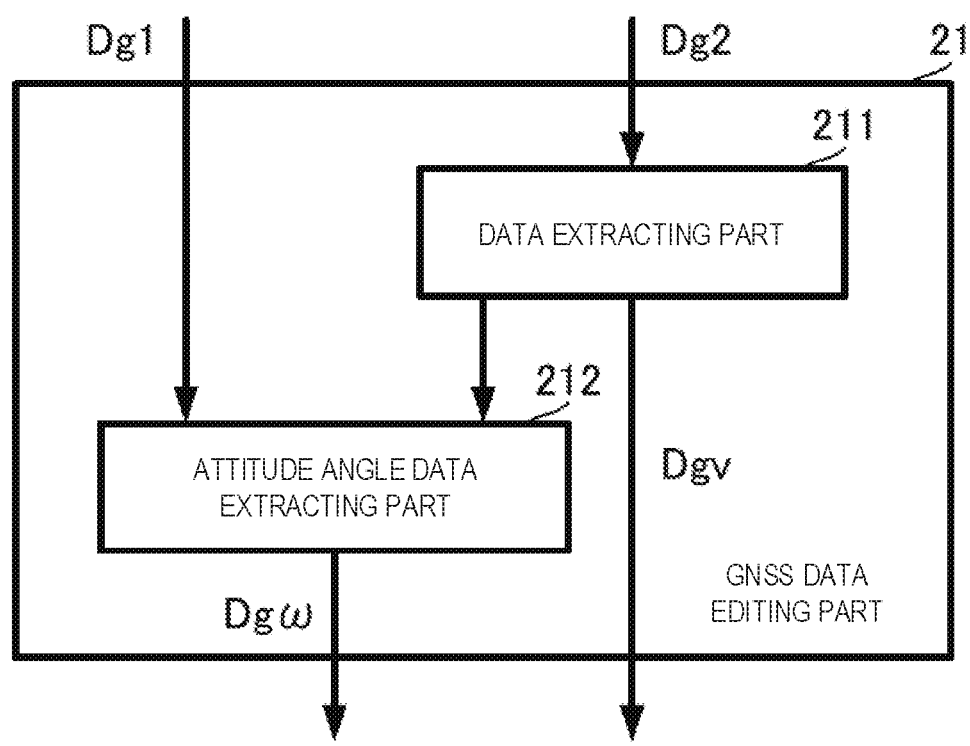
FIG. 2 is a functional block diagram of a GNSS data editing part.
Figure 3:
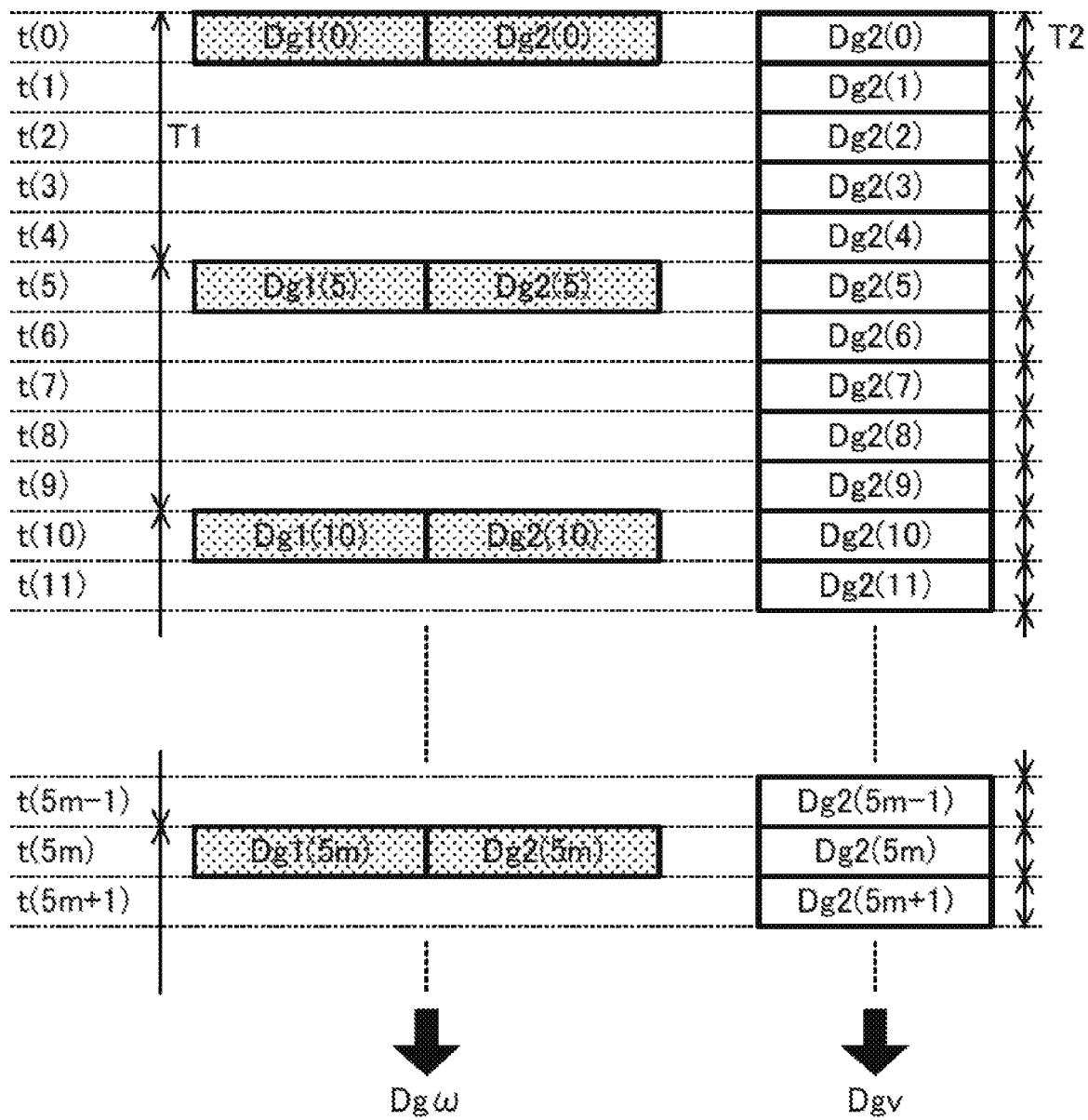
FIG. 3 is a view illustrating a concept of generating GNSS attitude angle estimation data and GNSS speed estimation data.

FIG. 2 is a functional block diagram of the GNSS data editing part. FIG. 3 is a view illustrating a concept of generating the GNSS attitude angle estimation data and the GNSS speed estimation data.

As illustrated in FIG. 2, the GNSS data editing part 21 may include a data extracting part 211 and an attitude angle data generating part 212. The GNSS data Dg1 may be inputted into the attitude angle data generating part 212. The GNSS data Dg2 may be inputted into the data extracting part 211.

The data extracting part 211 may generate GNSS speed estimation data Dgv based on the GNSS data Dg2, and output it to the GNSS speed calculating part 25.

Moreover, the data extracting part 211 may extract the GNSS data Dg2 at a specific time, and output it to the attitude angle data generating part 212. The time when the GNSS data Dg2 is extracted may conform to a data cycle T1 of the GNSS data Dg1. In other words, the GNSS data Dg2 which is thinned out according to the data cycle T1 of the GNSS data Dg1 may be inputted into the attitude angle data generating part 212.

The attitude angle data generating part 212 may generate the GNSS attitude angle estimation data Dgω by grouping the GNSS data Dg1 and the extracted GNSS data Dg2, and output it to the GNSS attitude angle calculating part 24.

For example, as illustrated in FIG. 3, from a time t(0) to a time t(11), the data extracting part 211 may output GNSS data Dg2(0) to Dg2(11) acquired respectively at a data cycle T2 as the GNSS speed estimation data Dgv. Similarly, from a time t(5m−1) to a time t(5m+1), the data extracting part 211 may output GNSS data Dg2(5m−1) to Dg2(5m+1) acquired respectively at the data cycle T2 as the GNSS speed estimation data Dgv.

Moreover, from the time t(0) to the time t(11), the data extracting part 211 may extract the GNSS data Dg2(0) at the time t(0) when the GNSS data Dg1(0) is acquired, the GNSS data Dg2(5) at the time t(5) when the GNSS data Dg1(5) is acquired, and the GNSS data Dg2(10) at the time t(10) when the GNSS data Dg1(10) is acquired, while synchronizing with the data cycle T1 of the GNSS data Dg1. Similarly, from the time t(5m−1) to the time t(5m+1), the data extracting part 211 may extract the GNSS data Dg2(5m) at the time t(5m) when the GNSS data Dg1(5m) is acquired, while synchronizing with the data cycle T1 of the GNSS data Dg1.

The attitude angle data generating part 212 may output the GNSS data Dg1(0) and the GNSS data Dg2(0) corresponding to the time t(0) as attitude angle estimation data Dgω at the time t(0). Similarly, the attitude angle data generating part 212 may output the GNSS data Dg1(5) and the GNSS data Dg2(5) corresponding to the time t(5) as attitude angle estimation data Dgω at the time t(5). The attitude angle data generating part 212 may output the GNSS data Dg1(10) and the GNSS data Dg2(10) corresponding to the time t(10) as attitude angle estimation data Dgω at the time t(10). The attitude angle data generating part 212 may output the GNSS data Dg1(5m) and the GNSS data Dg2(5m) corresponding to the time t(5m) as attitude angle estimation data Dgω at the time t(5m).

By performing such processing, the data cycle of the attitude angle estimation data Dgω may become longer than the data cycle of the speed estimation data Dgv. Therefore, an amount of data of the attitude angle estimation data Dgω per unit time may become less than a case where all the GNSS data Dg2 are used for the calculation of the attitude angle. Therefore, the amount of data processed by the integrated calculating part 20 during the unit time may be reduced.

The GNSS attitude angle calculating part 24 may calculate a GNSS attitude angle Φg by a known method based on the attitude angle estimation data Dgω. The GNSS speed calculating part 25 may calculate a GNSS speed Vg by a known method based on the speed estimation data Dgv.

Figure 4:
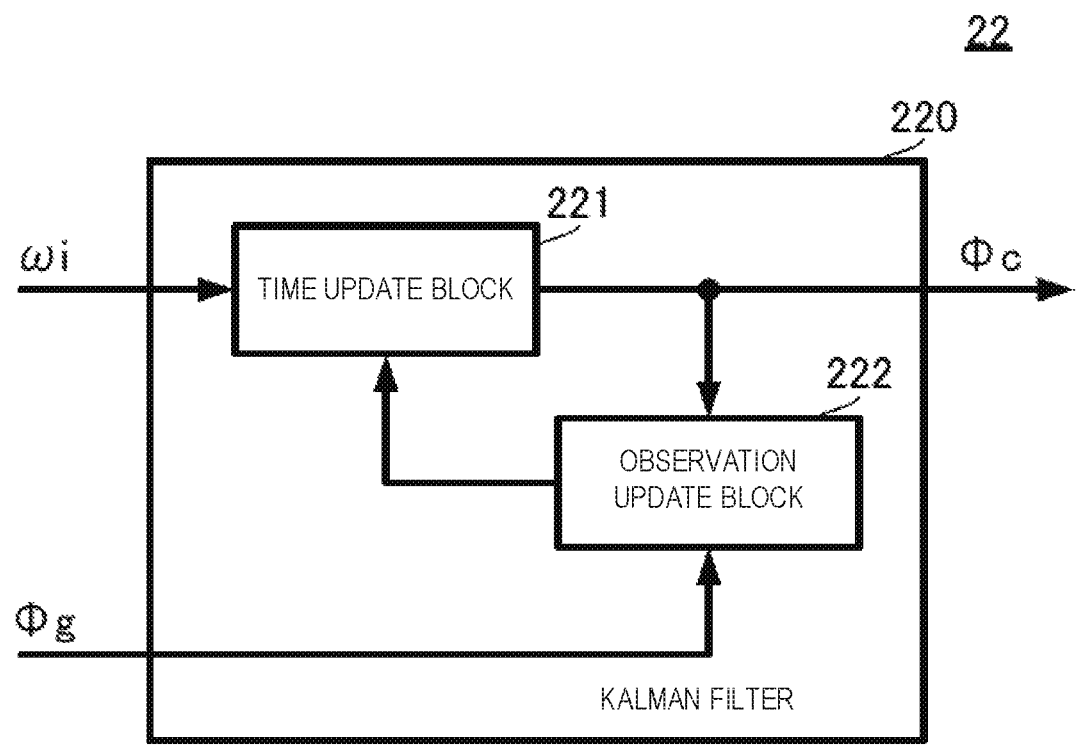
FIG. 4 is a functional block diagram of an attitude angle calculating part.

The attitude angle calculating part 22 may estimate an integrated attitude angle Φc based on the IMU angular velocity ωi and the GNSS attitude angle Φg. FIG. 4 is a functional block diagram of the attitude angle calculating part.

As illustrated in FIG. 4, the attitude angle calculating part 22 may be comprised of a Kalman filter 200. The Kalman filter 200 may include a time update block 221 and an observation update block 222. Observing values of the Kalman filter 200 may be the IMU angular velocity ωi and the GNSS attitude angle Φg, and a state variable (unknown value) includes the integrated attitude angle Φc. By such a configuration, the attitude angle calculating part 22 can estimate the integrated attitude angle Φc. The attitude angle calculating part 22 may output the integrated attitude angle Φc to the displacement calculating part 23.

Figure 5:
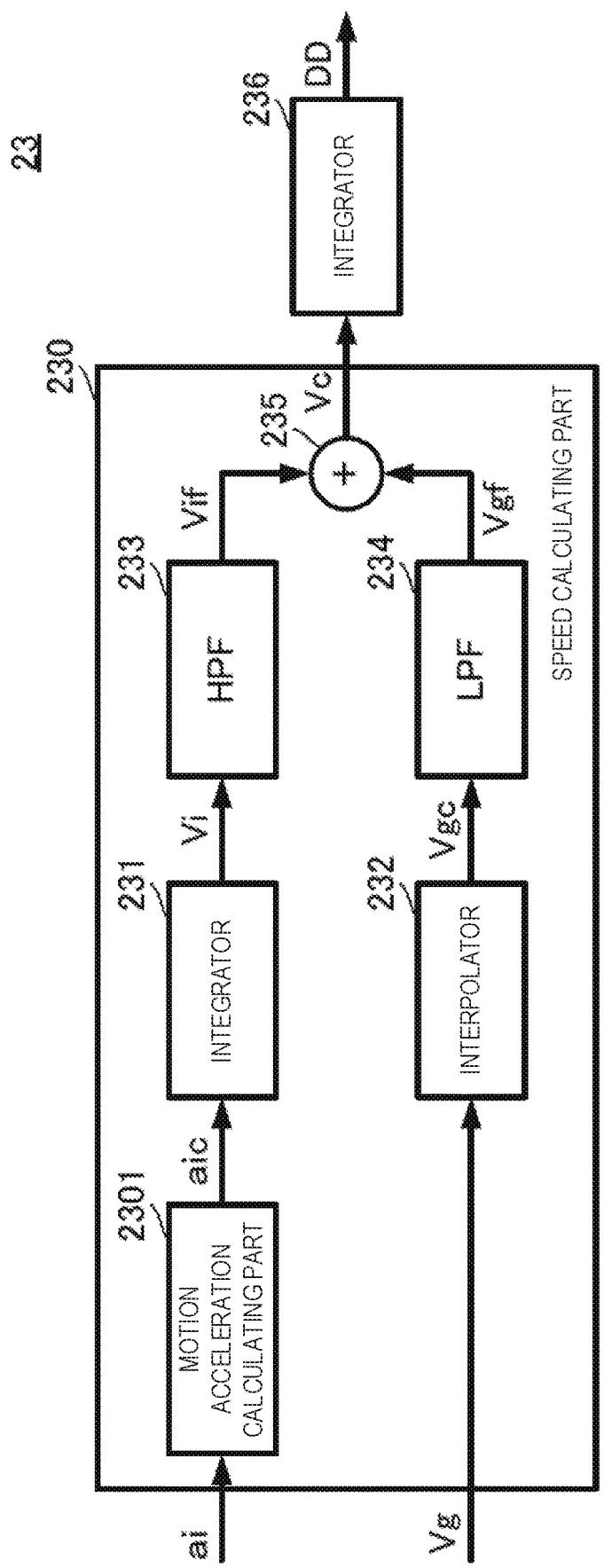
FIG. 5 is a functional block diagram of a displacement calculating part.

The displacement calculating part 23 may estimate an integrated speed Vc based on the IMU acceleration ai, the GNSS speed Vg, and the integrated attitude angle Φc. Here, the displacement calculating part 23 may perform a coordinate conversion of the GNSS coordinate system and the IMU coordinate system based on a rotation matrix obtained from the integrated attitude angle Φc. Further, the displacement calculating part 23 may calculate a displacement D based on the integrated speed Vc. FIG. 5 is a functional block diagram of the displacement calculating part.

As illustrated in FIG. 5, the displacement calculating part 23 may include a speed calculating part 230 and an integrator 236. The integrator 236 may correspond to a "displacement integrator" of the present disclosure.

As illustrated in FIG. 5, the speed calculating part 230 may include a motion acceleration calculating part 2301, an integrator 231, an interpolator 232, a high pass filter (HPF) 233, a low pass filter (LPF) 234, and an adder 235. The HPF 233 may correspond to a "first filter" of the present disclosure, and the LPF 234 may correspond to a "second filter" of the present disclosure. By this configuration, the speed calculating part 230 may constitute a so-called "complementary filter."

The IMU acceleration ai may be inputted into the motion acceleration calculating part 2301. The motion acceleration calculating part 2301 may calculate an IMU motion acceleration aic which is obtained by subtracting the gravity from the IMU acceleration ai (including the gravity) by using the rotation matrix obtained from the integrated attitude angle Φc. The motion acceleration calculating part 2301 may output the IMU motion acceleration aic to the integrator 231. The integrator 231 may integrate the IMU motion acceleration aic to calculate an IMU speed Vi. The integrator 231 may output the IMU speed Vi to the HPF 233.

The HPF 233 may pass a high frequency component of the IMU speed Vi, and suppress a low frequency component. Therefore, observation errors, such as a bias error, included in the IMU speed Vi, may be suppressed. The HPF 233 may output the filtered IMU speed Vif to the adder 235.

The GNSS speed Vg may be inputted into the interpolator 232. The interpolator 232 may interpolate, for example, a value of zero, to a time when IMU speed exists but the GNSS speed Vg does not exist. Thus, an interpolated GNSS speed Vgc having the same updating cycle as the IMU speed may be generated. The interpolator 232 may output the interpolated GNSS speed Vgc to the LPF 234.

The LPF 234 may pass a low frequency component of the interpolated GNSS speed Vgc, and suppress a high frequency component. Thus, noise caused by the interpolation, which is included in the interpolated GNSS speed Vgc, may be suppressed. That is, the filtered GNSS speed Vgf outputted from the LPF 234 may become equivalent to the GNSS speed Vg which is up-sampled at the same cycle as the IMU speed Vi. The LPF 234 may output the filtered GNSS speed Vgf to the adder 235.

The adder 235 may add the filtered IMU speed Vif to the filtered GNSS speed Vgf to calculate an integrated speed Vc.

By using such a configuration and processing, the fall of the accuracy of the integrated speed Vc can be prevented while realizing the same short updating cycle as the IMU acceleration ai. That is, although the updating cycle of the IMU acceleration ai is shorter than the updating cycle of the GNSS speed Vg, the accuracy of the IMU acceleration ai may become lower than the accuracy of the GNSS speed Vg. On the other hand, although the accuracy of the GNSS speed Vg is high, the updating cycle of the GNSS speed Vg may become longer than the updating cycle of the IMU acceleration ai. However, by using the complementary filter described above, the longer length of the updating cycle of the GNSS speed Vg and the lower accuracy of the IMU acceleration ai may be eliminated, and, therefore, the integrated speed Vc can achieve both the short updating cycle and the high accuracy.

Moreover, by using the integrated attitude angle Φc estimated by the attitude angle calculating part 22, the angular error of the IMU coordinate system (hull coordinate system) and the GNSS coordinate system (NED coordinate system (local tangent coordinate system)) can be corrected with high precision. Therefore, the integrated speed Vc may be calculated with higher precision.

Here, the GNSS attitude angle ΦDg used for the estimation of the integrated attitude angle Φc may have a longer updating cycle than the GNSS speed Vg used for the estimation of the integrated speed Vc. Thus, even if the updating cycle of the GNSS attitude angle Φg is made longer, since the accuracy of the IMU angular velocity ωi is high, the accuracy of the integrated attitude angle Φc may hardly fall. Therefore, the updating cycle of the GNSS attitude angle estimation data can be made longer, and the amount of the GNSS attitude angle estimation data can be kept low.

If the updating cycle of the GNSS speed Vg may be made longer, since the accuracy of the IMU acceleration ai is low, the estimation accuracy of the integrated speed Vc falls greatly. It may be common for an in-vehicle apparatus, such as a car navigation device, to appropriately estimate the speed and the displacement by integrating other sensors, such as a vehicle speed pulse sensor. However, for apparatuses mounted on a ship, an aerial mobile body, etc., this approach cannot be adopted, and may be common to integrate the IMU and the GNSS.

In this case, in order to estimate the integrated speed Vc with high precision, the updating cycle of the GNSS speed estimation data must be shortened, and, therefore, the updating cycle cannot be made longer. Therefore, in order to reduce the amount of data while maintaining the high accuracy, it may be effective to shorten the updating cycle of the GNSS speed estimation data and to lengthen the updating cycle of the GNSS attitude angle estimation data.

The speed calculating part 230 may output the integrated speed Vc to the integrator 236. The integrator 236 may integrate the integrated speed Vc to calculate the displacement D. Here, since the integrated speed Vc is highly precise as described above, its error may be small. Therefore, an error of the displacement D obtained by integrating the integrated speed Vc may be small.

As described above, by using the configuration and processing of this embodiment, while the navigation device 10 keeps the amount of data to be processed low, it can estimate (calculate) the navigation support information including the integrated speed Vc and the displacement D at the fast updating cycle and with highly precision. Note that the navigation support information may include the integrated attitude angle Φc.

In the above description, the Kalman filter may be used for the attitude angle calculating part 22. However, the attitude angle calculating part 22 may not be limited to the Kalman filter, but the IMU angular velocity ωi and the GNSS attitude angle Φg may be used as the observing values (known values), and the attitude angle calculating part 22 may be realized by an estimating equation using a state space model in which the integrated attitude angle Φc is an unknown value. Further, it may also be possible to apply the complementary filter used for the speed calculating part 230 to the attitude angle calculating part 22. In this case, the lower frequency side may be the GNSS attitude angle Φg, and the higher frequency side may be the IMU angular velocity ωi.

Figure 6:
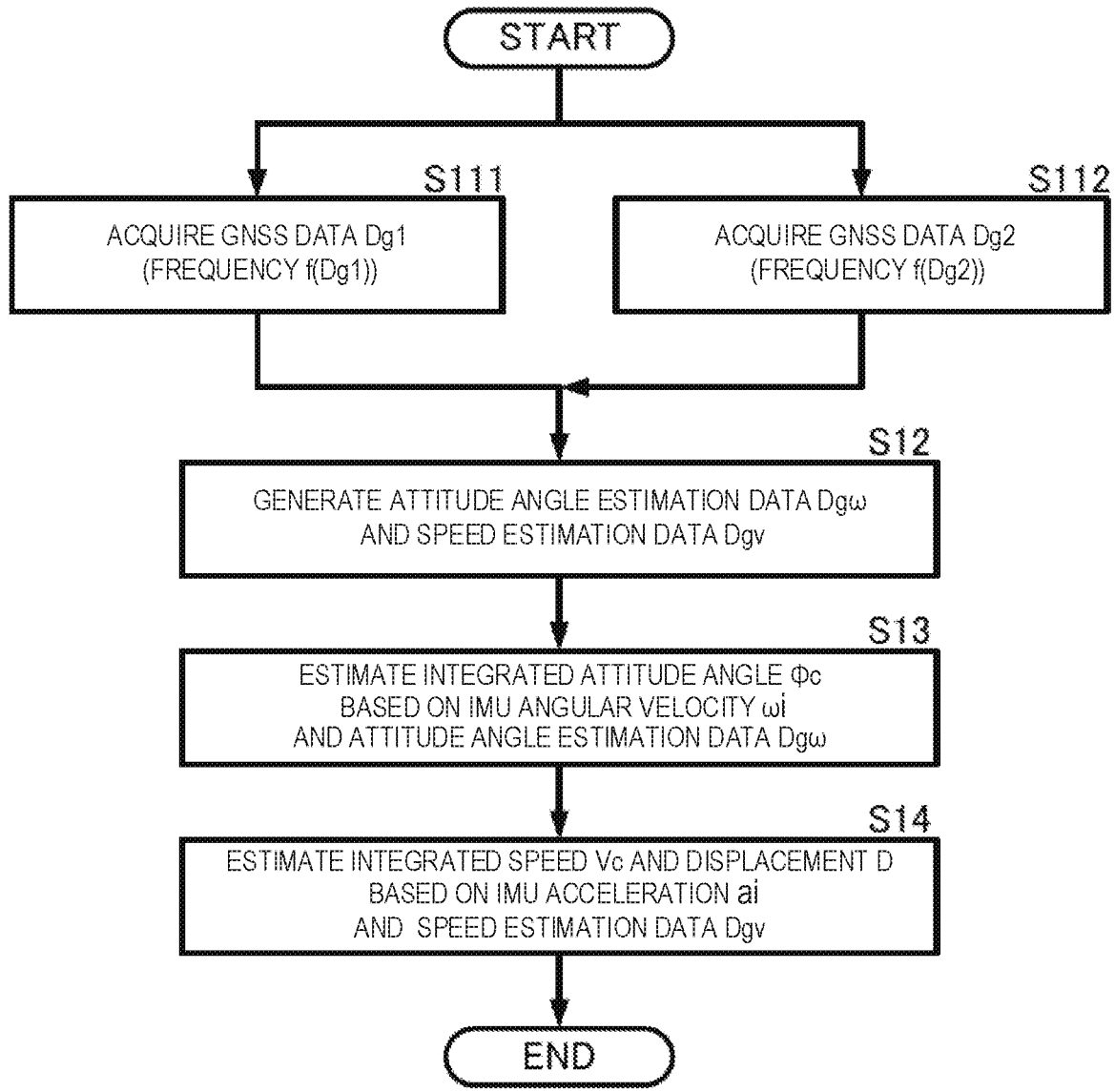
FIG. 6 is a flowchart illustrating a method of generating navigation support information according to the first embodiment of the present disclosure.

In the above description, each processing executed by the navigation device 10 may be executed by the individual functional block. However, each processing executed by the navigation device 10 may be programmed as the navigation support information generating program and stored in a storage medium, and the program may be executed by a processor. In this case, the navigation support information may be generated based on a flowchart illustrated in FIG. 6. FIG. 6 is a flowchart illustrating a method of generating the navigation support information according to the first embodiment of the present disclosure. Note that a further description of the part described above in the concrete contents of each processing illustrated in the flowchart is omitted.

The processor may acquire the GNSS data Dg1 at a time interval defined by the frequency f(Dg1) (S111). In parallel with this, the processor may acquire the GNSS data Dg2 at a time interval defined by the frequency f(Dg2) (S112). The frequency f(Dg2) may be higher than the frequency f(Dg1).

The processor may generate the attitude angle estimation data Dgω based on a part of the GNSS data Dg1 and the GNSS data Dg2. The processor may generate the speed estimation data Dgv based on the GNSS data Dg2 (S12).

The processor may estimate the integrated attitude angle Φc based on the IMU angular velocity ωi and the attitude angle estimation data Dgω (S13).

The processor may estimate the integrated speed Vc and the displacement D based on the IMU acceleration ai, the speed estimation data Dgv, and the integrated attitude angle Φc (S14).

Next, a navigation device according to a second embodiment of the present disclosure is described with reference to the drawings. The navigation device according to the second embodiment differs from the navigation device according to the first embodiment in the configuration of the displacement calculating part. Other configurations of the navigation device according to the second embodiment are similar to those of the navigation device according to the first embodiment, and, therefore, the description of the similar parts is omitted.

Figure 7:
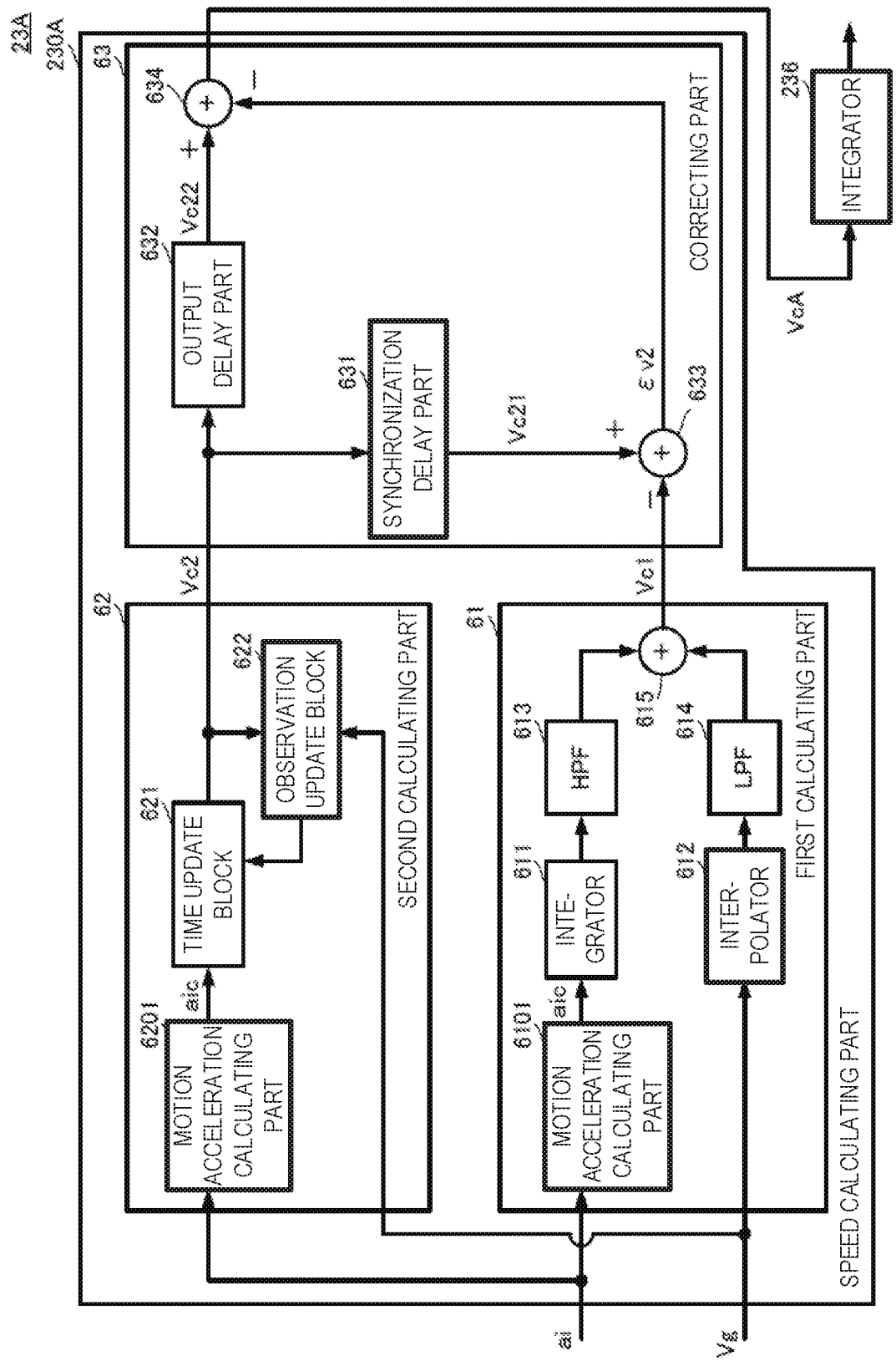
FIG. 7 is a functional block diagram of a displacement calculating part of a navigation device according to a second embodiment of the present disclosure.

FIG. 7 is a functional block diagram of the displacement calculating part of the navigation device according to the second embodiment of the present disclosure. As illustrated in FIG. 7, the displacement calculating part 23A may include a speed calculating part 230A and an integrator 236. The speed calculating part 230A may include a first calculating part 61, a second calculating part 62, and a correcting part 63.

The first calculating part 61 may include a motion acceleration calculating part 6101, an integrator 611, an interpolator 612, a HPF 613, a LPF 614, and an adder 615. The first calculating part 61 may have a similar configuration to the speed calculating part 230 illustrated in the first embodiment. The motion acceleration calculating part 6101 may correspond to the motion acceleration calculating part 2301, the integrator 611 may correspond to the integrator 231, and the interpolator 612 may correspond to the interpolator 232. The HPF 613 may correspond to the HPF 233, and the LPF 614 may correspond to the LPF 234. The adder 615 may correspond to the adder 235.

The IMU acceleration ai and the GNSS speed Vg may be inputted into the first calculating part 61, the first calculating part 61 may estimate a first speed Vc1 and output it to the correcting part 63. The first speed Vc1 may be the same as the integrated speed Vc according to the first embodiment.

The second calculating part 62 may include a motion acceleration calculating part 6201, and a Kalman filter similar to the attitude angle calculating part 22 according to the first embodiment. The motion acceleration calculating part 6201 may calculate the IMU motion acceleration aic based on the IMU acceleration ai by using the rotation matrix obtained by the integrated attitude angle Φc. The Kalman filter of the second calculating part 62 may have a time update block 621 and an observation update block 622. The observing values of the second calculating part 62 may be the IMU motion acceleration aic and the GNSS speed Vg, and a state variable (unknown) includes the second speed Vc2. By such a configuration, the second calculating part 62 can estimate the second speed Vc2. The second calculating part 62 may output the second speed Vc2 to the correcting part 63.

The correcting part 63 may include a synchronization delay part 631, an output delay part 632, a subtractor 633, and a subtractor 634. The first speed Vc1 may be inputted into the subtractor 633. The second speed Vc2 may be inputted into the synchronization delay part 631 and the output delay part 632.

The synchronization delay part 631 may delay the second speed Vc2 so that a delayed part of the filtering by the first calculating part 61 is compensated. The synchronization delay part 631 may output a delayed second speed Vc21 to the subtractor 633.

The subtractor 633 may subtract the first speed Vc1 from the delayed second speed Vc21 to calculate an estimation error εv2. The subtractor 633 may output the estimation error εv2 to the subtractor 634.

The output delay part 632 may delay the second speed Vc2. An amount of delay of the output delay part 632 may be smaller than the amount of delay of the synchronization delay part 631. The output delay part 632 may output the delayed second speed Vc22 to the subtractor 634.

The subtractor 634 may subtract the estimation error εv2 from the second speed Vc22, and output an integrated speed VcA.

The integrated speed VcA may be based on the second speed Vc2 estimated by the second calculating part 62 which uses the Kalman filter. Therefore, although the second speed Vc2 is hardly delayed, the second calculating part 62 may have a more estimation error than the first calculating part 61.

However, in this configuration and processing, the estimation error of the second speed Vc2 may be calculated with high precision based on the highly-precise first speed Vc1, and the second speed Vc2 may be corrected by the estimation error. Here, the amount of delay of the second speed of which the estimation error is corrected may depend on the amount of delay of the output delay part 632. Therefore, by suitably setting the amount of delay of the output delay part 632, the speed calculating part 230A can estimate the highly-precise integrated speed VcA, without being delayed. Moreover, the speed calculating part 230A can estimate the integrated speed VcA with higher precision within a permissible range of the amount of delay.

Figure 8:
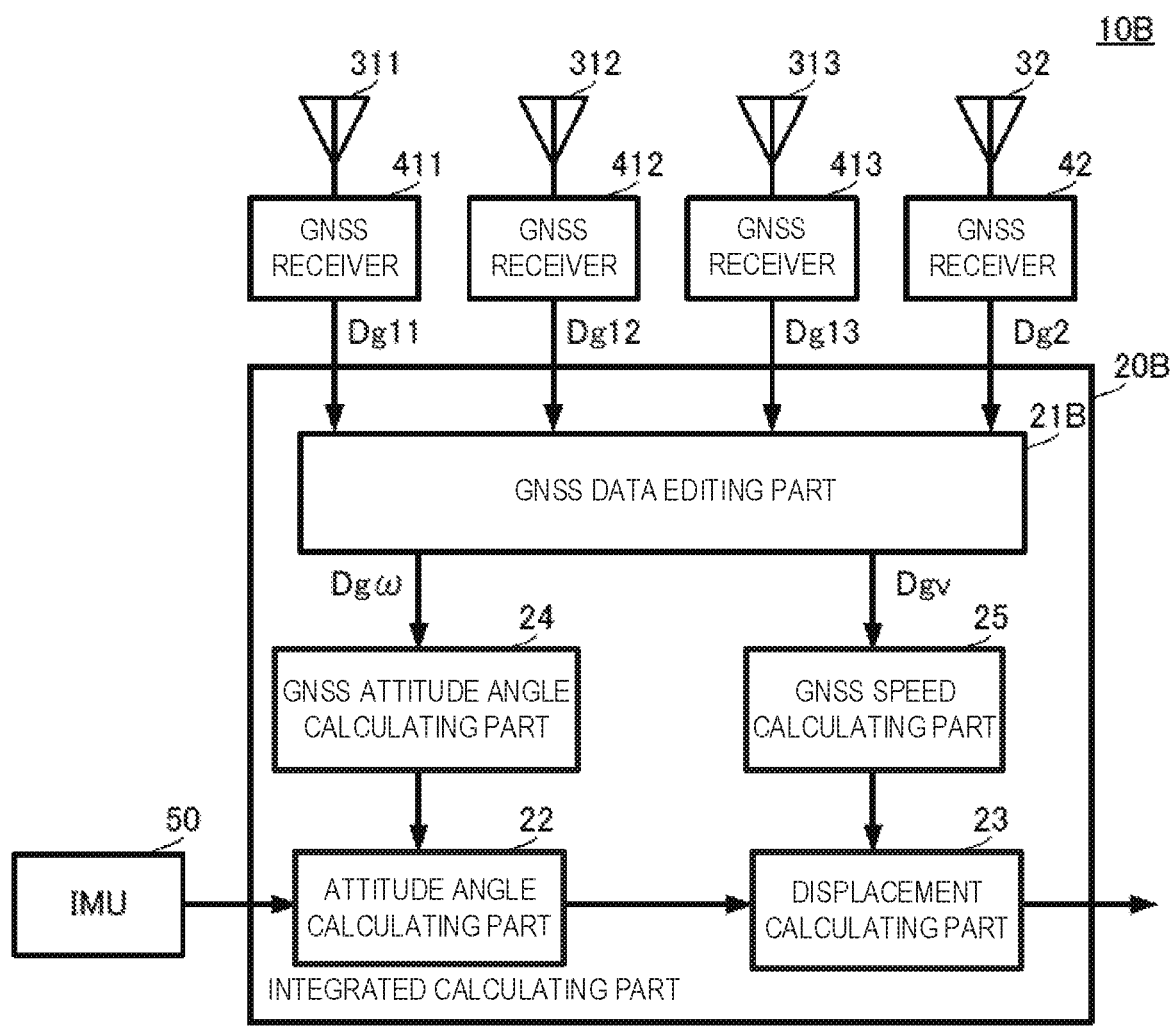
FIG. 8 is a functional block diagram of a navigation device according to a third embodiment of the present disclosure.

Next, a navigation device according to a third embodiment of the present disclosure is described with reference to the drawings. FIG. 8 is a functional block diagram of the navigation device according to the third embodiment of the present disclosure. As illustrated in FIG. 8, a navigation device 10B may differ from the navigation device 10 according to the first embodiment in that the number of antennas and the number of GNSS receivers are increased, and in the processing of a GNSS data editing part 21B. Other fundamental configurations and processings of the navigation device 10B are similar to those of the navigation device 10, and, therefore, the description of the similar parts is omitted.

The navigation device 10B may include an integrated calculating part 20B, a GNSS antenna 311, a GNSS antenna 312, a GNSS antenna 313, a GNSS antenna 32, a GNSS receiver 411, a GNSS receiver 412, a GNSS receiver 413, a GNSS receiver 42, and an IMU 50. The GNSS antenna 311, the GNSS antenna 312, and the GNSS antenna 313 may correspond to the "first antenna" of the present disclosure, and the GNSS antenna 32 may correspond to the "second antenna" of the present disclosure.

The integrated calculating part 20B may include a GNSS data editing part 21B, an attitude angle calculating part 22, a displacement calculating part 23, a GNSS attitude angle calculating part 24, and a GNSS speed calculating part 25.

The GNSS antenna 311, the GNSS antenna 312, the GNSS antenna 313, and the GNSS antenna 32 may be installed in a ship (not illustrated) to which the navigation device 10B is mounted. The GNSS antenna 311, the GNSS antenna 312, the GNSS antenna 313, and the GNSS antenna 32 may be installed in a so-called "Open Sky environment." The GNSS antenna 311, the GNSS antenna 312, the GNSS antenna 313, and the GNSS antenna 32 may be disposed so that all are not simultaneously lined up on a straight line.

The GNSS antenna 311 may receive a GNSS signal from a GNSS satellite (not illustrated), and output it to the GNSS receiver 411. The GNSS antenna 312 may receive a GNSS signal from a GNSS satellite (not illustrated), and output it to the GNSS receiver 412. The GNSS antenna 313 may receive a GNSS signal from a GNSS satellite (not illustrated), and output it to the GNSS receiver 413. The GNSS antenna 32 may receive a GNSS signal from a GNSS satellite (not illustrated), and output it to the GNSS receiver 42.

The GNSS receiver 411 may acquire GNSS data Dg11 by acquisition and tracking, and output it to the integrated calculating part 20B. The GNSS receiver 412 may acquire the GNSS data Dg12 by acquisition and tracking, and output it to the integrated calculating part 20B. The GNSS receiver 413 may acquire the GNSS data Dg13 by acquisition and tracking, and output it to the integrated calculating part 20B. Here, the GNSS receiver 411, the GNSS receiver 412, and the GNSS receiver 413 may perform the acquisition and the output of the GNSS data Dg11, the GNSS data Dg12, and the GNSS data Dg13 at an interval of the first frequency f(Dg1).

The GNSS receiver 42 may acquire the GNSS data Dg2 by acquisition and tracking, and output it to the integrated calculating part 20B. Here, the GNSS receiver 42 may perform the acquisition and the output of the GNSS data Dg2 at an interval of the second frequency f(Dg2).

The GNSS data Dg11, the GNSS data Dg12, the GNSS data Dg13, and the GNSS data Dg2 may be inputted into the GNSS data editing part 21B. The GNSS data editing part 21B may generate GNSS attitude angle estimation data Dgω and GNSS speed estimation data Dgv based on the GNSS data Dg11, the GNSS data Dg12, the GNSS data Dg13, and the GNSS data Dg2. In more detail, the GNSS data editing part 21B may generate the GNSS speed estimation data Dgv based on the GNSS data Dg2. The GNSS data editing part 21B may extract the GNSS data Dg2 at a specific time. The GNSS data editing part 21B may generate the GNSS attitude angle estimation data Dgω based on the extracted GNSS data Dg2, and the GNSS data Dg11, the GNSS data Dg12, and the GNSS data Dg13.

By using such a configuration and processing, the attitude angle estimation data Dgω can be acquired more certainly, and it may be easy to improve the accuracy of the estimation of the integrated attitude angle Φc. In addition, even in this case, since the acquisition interval of the GNSS data Dg11, the GNSS data Dg12, and the GNSS data Dg13 is long (low frequency), the increase in the amount of processing data for the integrated calculating part 20B can be effectively reduced.

Figure 9:
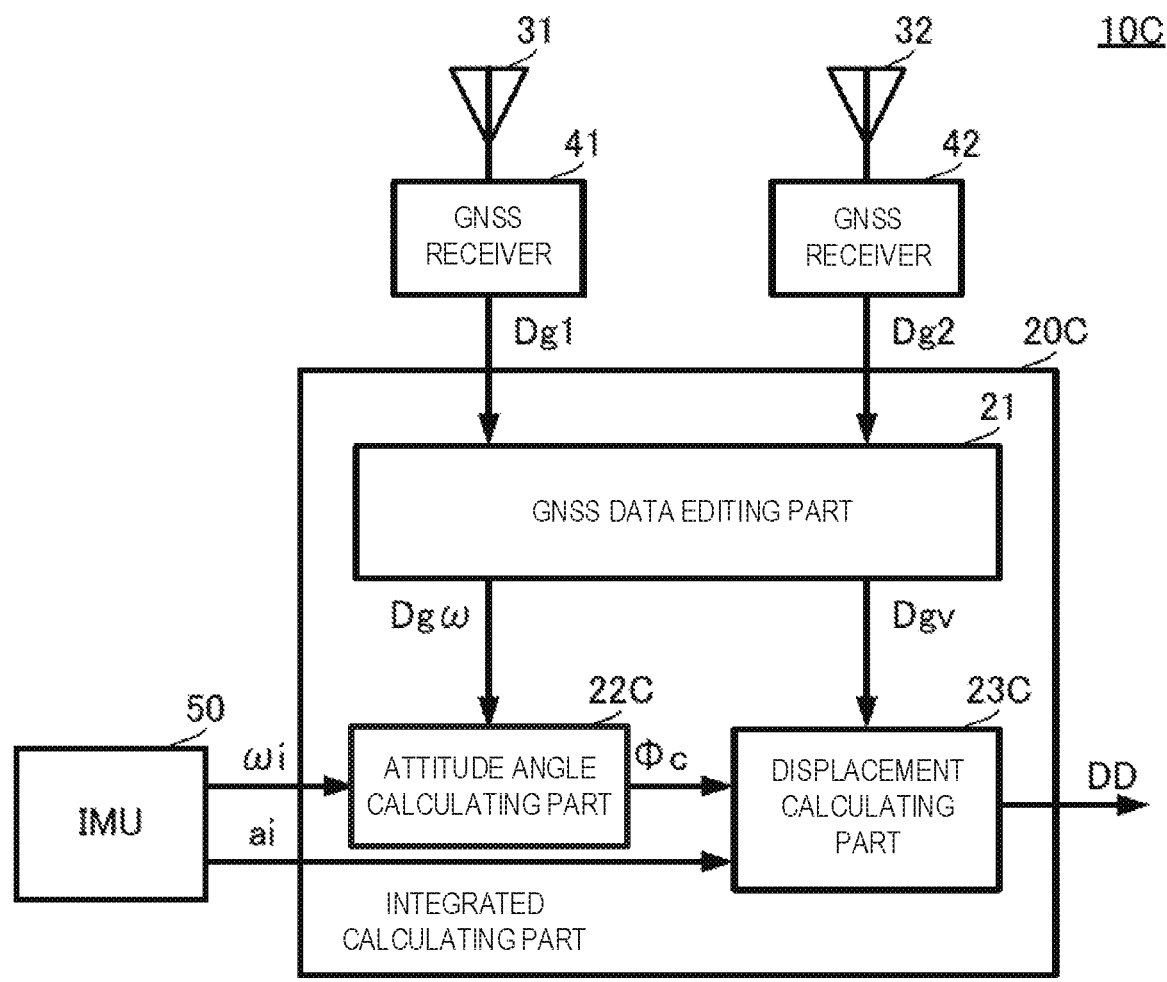
FIG. 9 is a functional block diagram of a navigation device according to a fourth embodiment of the present disclosure.

Next, a navigation device according to a fourth embodiment of the present disclosure is described with reference to the drawings. FIG. 9 is a functional block diagram of the navigation device according to the fourth embodiment of the present disclosure. As illustrated in FIG. 9, a navigation device 10C may differ from the navigation device 10 according to the first embodiment in the configuration and processing of an integrated calculating part 20C. Other fundamental configurations and processings of the navigation device 10C may be similar to those of the navigation device 10, and, therefore, the description of the similar parts is omitted.

The integrated calculating part 20C may include a GNSS data editing part 21, an attitude angle calculating part 22C, and a displacement calculating part 23C. That is, the integrated calculating part 20C omits the GNSS attitude angle calculating part 24 and the GNSS speed calculating part 25 from the integrated calculating part 20 according to the first embodiment.

In this case, the GNSS data editing part 21 may output the GNSS attitude angle estimation data Dgω to the attitude angle calculating part 22C. Moreover, the GNSS data editing part 21 may output the GNSS speed estimation data Dgv to the displacement calculating part 23C.

The attitude angle calculating part 22C may estimate the integrated attitude angle Φc based on the GNSS attitude angle estimation data Dgω and the IMU angular velocity ωi.

The displacement calculating part 23C may estimate the integrated speed Vc based on the IMU acceleration ai, the GNSS speed estimation data Dgv, and the integrated attitude angle Φc.

Even by such a configuration and processing, the speed and the displacement can be calculated with high precision, while preventing the increase in the amount of processing data, similar to the above embodiments.

Note that the configuration of the fourth embodiment is also applicable to the configuration of the second embodiment and the configuration of the third embodiment.

Moreover, in the above description, GNSS attitude angle estimation data Dgω may be generated based on the GNSS data Dg1 and the GNSS data Dg2. However, the GNSS attitude angle estimation data Dgω may be generated only based on the GNSS data Dg1. In this case, the GNSS data editing part 21 may not need to be separately provided with the data extracting part 211 and the attitude angle data generating part 212. That is, the GNSS data editing part 21 may output the GNSS data Dg1 as the GNSS attitude angle estimation data Dgω, and may output the GNSS data Dg2 as the GNSS speed estimation data Dgv.

Moreover, in the above description, the directions of the speed and the displacement may not be defined in detail. However, the speed and the displacement may not be limited in the horizontal direction, but may also be applied to the vertical direction. That is, the configuration and processing described above may also be applicable to an estimation of heaving.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A navigation device, comprising:
    processing circuitry configured to:
        generate Global Navigation Satellite System (GNSS) attitude angle estimation data and GNSS speed estimation data by using first GNSS data based on a GNSS signal received by a first antenna, and second GNSS data obtained at a data cycle shorter than a data cycle of the first GNSS data based on a GNSS signal received by a second antenna;
        estimate an integrated attitude angle based on the IMU angular velocity outputted from an Inertial Measurement Unit (IMU) and the GNSS attitude angle estimation data; and
        estimate an integrated speed based on an IMU acceleration outputted from the IMU, the GNSS speed estimation data, and the integrated attitude angle.

2. The navigation device of claim 1, wherein the processing circuitry is further configured to:
    generate the GNSS speed estimation data based on the second GNSS data, and extract the second GNSS data at the cycle of the first GNSS data; and
    generate the GNSS attitude angle estimation data based on an extracted second GNSS data, and the first GNSS data.

3. The navigation device of claim 1, herein the first antenna includes a plurality of first antennas.

4. The navigation device of claim 1, wherein the processing circuitry is further configured to carry out a complementary filtering of an IMU speed obtained based on the IMU acceleration, and a GNSS speed based on the GNSS speed estimation data to calculate the integrated speed.

5. The navigation device of claim 4, wherein the processing circuitry includes:
    an integrator configured to integrate the IMU acceleration;
    a first filter configured to suppress a low frequency component of an output of the integrator and pass a high frequency component;
    an interpolator configured to perform a data interpolation of the GNSS speed;
    a second filter configured to suppress a high frequency component of an output interpolator and pass a low frequency component; and
    an adder configured to add an output of the first filter to an output of the second filter, and output the integrated speed.

6. The navigation device of claim 1, wherein the processing circuitry is further configured to:
    calculate a first speed by carrying out a complementary filtering of the IMU speed obtained based on the IMU acceleration, and a GNSS speed based on the GNSS speed estimation data;
    estimate a second speed by using the IMU acceleration and the GNSS speed as observational data and performing a filtering using a state space model;
    calculate an estimation error of the second speed based on the first speed and the second speed; and
    subtract the estimation error from the second speed and output the integrated speed.

7. The navigation device of claim 6, wherein the processing circuitry includes:
    are integrator configured to integrate the IMU acceleration;
    a first filter configured to suppress a low frequency component of an output of the integrator and pass a high frequency component;
    an interpolator configured to perform a data interpolation of the GNSS speed;

a second filter configured to suppress a high frequency
component of an output interpolator and pass a low
frequency component; and
an adder configured to add an output of the first filter to
an output of the second filter, and output the integrated
speed.
8. The navigation device of claim 6, wherein the processing circuitry is further configured to:
synchronize the second speed with the first speed;
subtract the first speed from a synchronized second speed,
and output the estimation error;
synchronize the second speed with the estimation error;
and
subtract the estimation error from the second speed, and
output the integrated speed.
9. The navigation device of claim 1, wherein the processing circuitry is further configured to calculate a displacement by integrating the integrated speed.
10. A navigation device, comprising:
an integrator configured to integrate an IMU acceleration
obtained from an output of an Inertial Measurement
Unit (IMU) sensor;
a first filter configured to suppress a low frequency
component of an output of the integrator and pass a
high frequency component;
an interpolator configured to perform a data interpolation
of a Global Navigation Satellite System (GNSS) speed
that is obtained based on a GNSS signal having a data
acquisition cycle that is longer than a data acquisition
cycle of the IMU acceleration;
a second filter configured to suppress a high frequency
component of an output interpolator and pass a low
frequency component; and
an adder configured to calculate an integrated speed by
adding an output of the first filter to an output of the
second filter.
11. A method of generating navigation support information, comprising the steps of:
generating first Global Navigation Satellite System
(GNSS) data based on a GNSS signal received by a first
antenna;
generating second GNSS data obtained at a data cycle
shorter than a data cycle of the first GNSS data based
on a GNSS signal received by a second antenna;
generating GNSS attitude angle estimation data at least
based on the first GNSS data;
generating GNSS speed estimation data based on the
second GNSS data;
estimating an integrated attitude angle based on an IMU
angular velocity outputted from an Inertial Measurement Unit (IMU) and the GNSS attitude angle estimation data; and
estimating an integrated speed based on an IMU acceleration outputted from the IMU, the GNSS speed
estimation data, and the integrated attitude angle.
12. The method of claim 11, wherein the second GNSS
data is extracted at the cycle of the first GNSS data, and
wherein the GNSS attitude angle estimation data is generated based on the extracted second GNSS data and
the first GNSS data.
13. The method of claim 11, wherein the integrated speed
is calculated by carrying out a complementary filtering of an
IMU speed obtained based on the IMU acceleration, and a
GNSS speed based on the GNSS speed estimation data.
14. The method of claim 13, wherein the IMU speed is
calculated by integrating the IMU acceleration,
wherein a first filtering is performed to suppress a low
frequency component of the IMU speed and pass a high
frequency component,
wherein a data interpolation of the GNSS speed is performed,
wherein a second filtering is performed to suppress a high
frequency component of the data-interpolated output
and pass a low frequency component, and
wherein an output of the first filtering is added to an
output of the second filtering, and the integrated speed
is outputted.
15. The method of claim 11, wherein a first speed is
calculated by carrying out a complementary filtering of an
IMU speed obtained based on the IMU acceleration, and a
GNSS speed based on the GNSS speed estimation data,
wherein a second speed is estimated by using the IMU
acceleration and the GNSS speed as observational data
and performing a filtering using a state space model,
wherein an estimation error of the second speed is calculated based on the first speed and the second speed,
and
wherein the estimation error is subtracted from the second
speed, and the integrated speed is outputted.
16. A non-transitory computer-readable recording
medium storing a control program causing a computer of a
navigation device to execute processing, the computer configured to control operation of the device, the processing
comprising:
generating first Global Navigation Satellite System
(GNSS) data based on a GNSS signal received by a first
antenna;
generating second GNSS data obtained at a data cycle
shorter than a data cycle of the first GNSS data based
on a GNSS signal received by a second antenna;
generating GNSS attitude angle estimation data at least
based on the first GNSS data;
generating GNSS speed estimation data based on the
second GNSS data;
estimating an integrated attitude angle based on an IMU
angular velocity outputted from an Inertial Measurement Unit (IMU) and the GNSS attitude angle estimation data; and
estimating an integrated speed based on an IMU acceleration outputted from the IMU, the GNSS speed
estimation data, and the integrated attitude angle.
17. The non-transitory computer-readable recording
medium of claim 16, wherein the second GNSS data is
extracted at the cycle of the first GNSS data, and
wherein the GNSS attitude angle estimation data is generated based on the extracted second GNSS data and
the first GNSS data.
18. The non-transitory computer-readable recording
medium of claim 16, wherein the integrated speed is calculated by carrying out a complementary filtering of an IMU
speed obtained based on the IMU acceleration, and a GNSS
speed based on the GNSS speed estimation data.
19. The non-transitory computer-readable recording
medium of claim 18, wherein the IMU speed is calculated by
integrating with the IMU acceleration,
wherein a first filtering is performed to suppress a low
frequency component of the IMU speed and pass a high
frequency component,
wherein a data interpolation of the GNSS speed is performed,
wherein a second filtering is performed to suppress a high
frequency component of the data-interpolated output
and pass a low frequency component, and wherein an output of the first filtering is added to an output of the second filtering, and the integrated speed is outputted.

20. The non-transitory computer-readable recording medium of claim 16, wherein the first speed is calculated by carrying out a complementary filtering of an IMU speed obtained based on the IMU acceleration, and a GNSS speed based on the GNSS speed estimation data, wherein a second speed is estimated by using the IMU acceleration and the GNSS speed as observational data and performing a filtering using a state space model, wherein an estimation error of the second speed is calculated based on the first speed and the second speed, and wherein the estimation error is subtracted from the second speed, and the integrated speed is outputted.

* * * * *